UNITED STATES PATENT OFFICE.

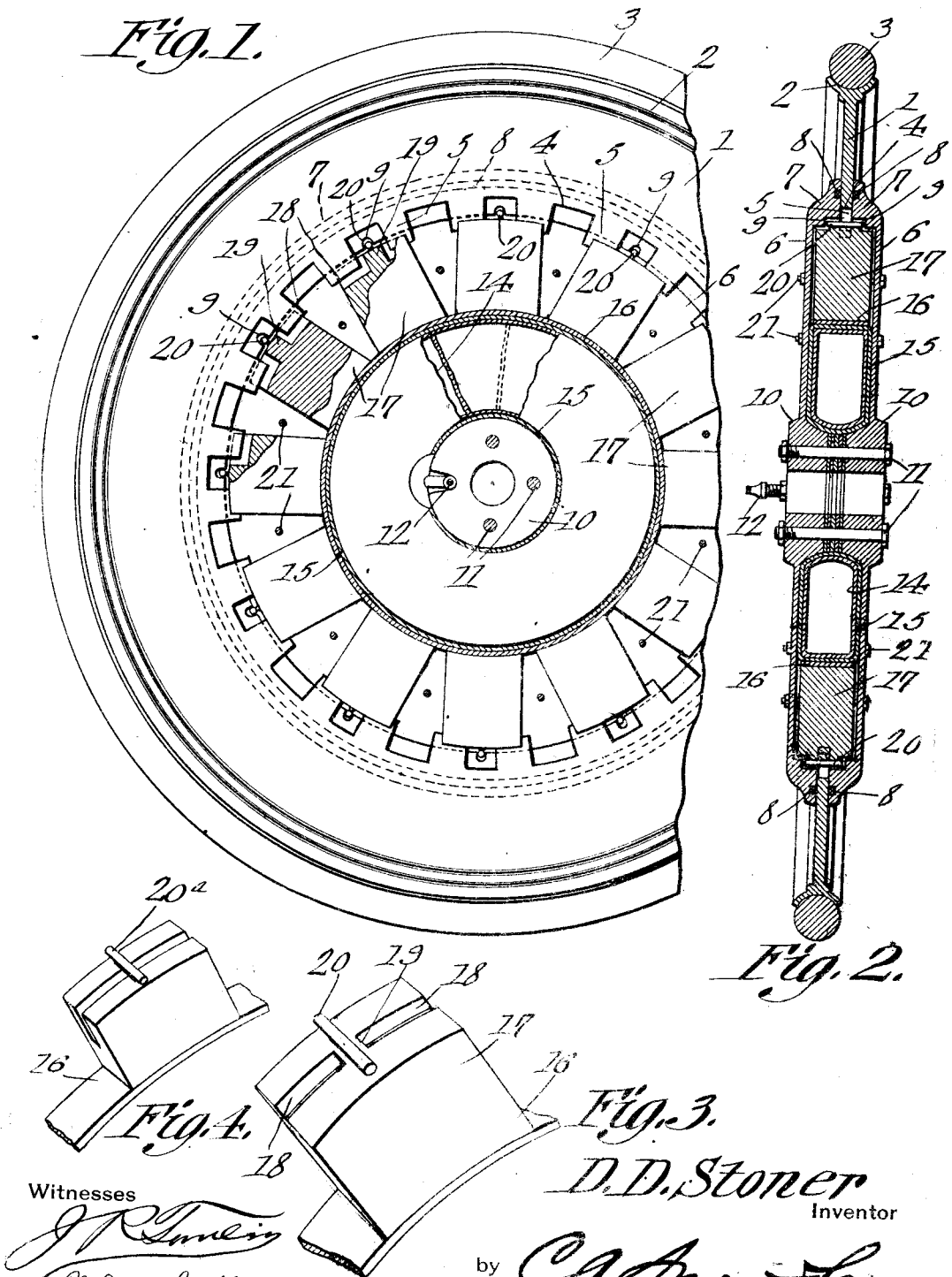

DAVID D. STONER, OF CINCINNATI, OHIO.

RESILIENT PNEUMATIC WHEEL.

1,182,433.  Specification of Letters Patent.  Patented May 9, 1916.

Application filed January 25, 1915. Serial No. 4,323.

*To all whom it may concern:*

Be it known that I, DAVID D. STONER, a citizen of the United States, residing at Cincinnati, in the county of Hamilton and State of Ohio, have invented a new and useful Resilient Pneumatic Wheel, of which the following is a specification.

The device forming the subject matter of this application is a resilient wheel and one object of the present invention is to provide a device of the type above mentioned in which the yieldable or inflatable element is housed completely within the contour of the body portion of the wheel, a puncture or injury to the inflatable element thus being avoided.

Another object of the invention is to provide novel means for effecting a driving engagement between the constituent parts of the wheel and to provide means whereby a circumferential creeping of one part upon another part will be avoided.

It is within the scope of the invention to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawing: Figure 1 shows the invention in side elevation, parts being broken away; Fig. 2 is a transverse section; Fig. 3 is a perspective showing one of the blocks which make up the yieldable band; Fig. 4 is a perspective showing a slightly modified form of securing block.

In the accompanying drawings the invention is shown as comprising an annular, plate-like body 1 equipped at its periphery with any suitable means 2 for holding a tire 3 of any desired form. In its inner edge, the annular body 1 is provided with a plurality of notches 4 defining projections 5.

Applied to opposed faces of the annular body 1 are side plates 6 comprising ribs 7 which bear slidably upon the opposite faces of the body 1. If desired, packing strips 8 may be seated in the inner faces of the ribs 7 to effect a tight joint between the side plates and the body 1. In the inner edges of the side plates 6, grooves or seats 9, arranged in circumferential order, are located. The side plates 6 are provided with coöperating hub-forming parts 10 united by securing elements 11. One of the securing elements 11 may be tubular and may constitute a part of a valve 12.

The valve 12 opens into a pneumatic element preferably in the form of a tube 14, the latter surrounding the hub 10—10 of the wheel and being located between the side plates 6. Surrounding the tube 14 is a yieldable band which is a composite structure, the band comprising a flexible strip 16 and blocks 17 which are attached to the strip. In the outer edges of the blocks 17 circumferentially extended grooves 18 are formed, the grooves of each block 17 being separated by a rib 19. Secured to the outer edge of each block 17 and extended across the rib 19 is a projection or rod 20. The rib 19 and the projection or rod 20 may be described as a transverse abutment on the block 17. If desired, the side plates 6 may be connected, between the blocks 17 by securing elements 21 and if desired, the resilient inflatable tube 14 may be surrounded by a covering 15 which may be resilient and in any event is yieldable.

When the tube 14 is inflated through the medium of the valve 12, the tube 14 is expanded radially of the wheel and expands the flexible strip 16, the blocks 17 thereon being carried outwardly until the cross pins or projections 20 on the block 17 enter and engage in the seats 9 which are fashioned in the side plates 6. The projections 5 on the annular body 1 enter the grooves 18 in the blocks 17 and, under circumferential pressure, engage with the ribs 19 to prevent further circumferential movement between the body 1 and the remaining portions of the wheel. It will be obvious, referring to Fig. 3, that if the ribs 19 are made thinner than shown or, if the ribs 19 are omitted, as shown in Fig. 4, the projections 20ª of Fig. 4 will take the place of the ribs 19 of Fig. 3.

As will be understood readily, the packing elements 8 serve to prevent the entrance of dirt and foreign matter between the ribs 7 of the side plates 6 and the annular body 1. The rod 20 and the seats 9 constitute interengaging parts which prevent a relative rotary movement between the side plates 6 and the blocks 17.

Having thus described the invention, what is claimed is:—

1. A resilient wheel comprising an annular body having projections upon its inner edge; side plates between which the body slides and provided with coöperating parts defining a hub, the side plates being provided with circumferentially arranged seats; an inflatable element surrounding the hub; a yieldable strip surrounding the inflatable element; and blocks secured to the strip, the blocks having grooves in their outer faces, the grooves being adapted to receive the projections on the body, the blocks being provided with transverse abutments coacting with the projections to form stops for limiting the circumferential movement of the body, portions of the abutments being received in the seats of the side plates.

2. A resilient wheel comprising an annular body having projections upon its inner edge; side plates between which the body slides; a resilient element located between the side plates; a yieldable strip surrounding the resilient element; and blocks secured to the strip, the blocks having grooves in their outer faces, the grooves being adapted to receive the projections on the body, the blocks being provided with transverse abutments coacting with the projections to form stops for limiting the circumferential movement of the body, portions of the abutments being received in the seats of the side plates.

3. A resilient wheel comprising an annular body having projections upon its inner edge; side plates between which the body slides and provided with circumferentially arranged seats; a resilient element between the side plates; a yieldable band surrounding the resilient element and provided with grooves in its outer face, the grooves being adapted to receive the projections, the band being provided with transverse abutments coacting with the projections to form stops for limiting the circumferential movement of the body, portions of the abutments being received in the seats of the side plates.

In testimony that I claim the foregoing as my own, I have hereto affixed my signature in the presence of two witnesses.

DAVID D. STONER.

Witnesses:
CAROLYNN BURKEL,
MILLIE BURKEL.